United States Patent [19]
Pardee

[11] Patent Number: 5,119,918
[45] Date of Patent: Jun. 9, 1992

[54] ELECTROMAGNETIC CLUTCH WITH PERMANENT MAGNET BRAKE

[75] Inventor: James A. Pardee, Janesville, Wis.

[73] Assignee: Dana Corporation, Toledo, Ohio

[21] Appl. No.: 774,992

[22] Filed: Oct. 11, 1991

[51] Int. Cl.$^5$ ............................................. F16D 67/06
[52] U.S. Cl. ................................ 192/18 B; 192/12 D; 56/11.3
[58] Field of Search ............................ 192/12 D, 18 B; 56/11.3

[56] References Cited

U.S. PATENT DOCUMENTS

| | | | |
|---|---|---|---|
| 2,612,248 | 9/1952 | Feiertag | 192/12 D X |
| 2,618,368 | 11/1952 | Hoover | 192/18 B |
| 2,646,145 | 7/1953 | Durston | 192/18 B |
| 3,642,104 | 2/1972 | Schafer | 192/18 B |
| 3,945,476 | 3/1976 | De Jong | 192/18 B X |
| 4,300,082 | 11/1981 | Angerbach et al. | 192/12 D X |
| 4,566,574 | 1/1986 | Marshall | 192/18 B X |

FOREIGN PATENT DOCUMENTS 2110609 10/1972 Fed. Rep. of Germany .... 192/18 R

*Primary Examiner*—Leslie A. Braun
*Assistant Examiner*—Nicholas Whitelaw
*Attorney, Agent, or Firm*—Leydig, Voit & Mayer

[57] ABSTRACT

Energization of an electric coil produces flux for attracting an armature of a clutch into engagement with a rotor in order to couple an input shaft to an output pulley. When the coil is de-energized, two angularly spaced permanent magnets pull the armature away from the rotor and into engagement with fixed pole pieces which cause a braking torque to be applied to the output pulley. The magnets are located closely adjacent one another and only along a short arc of the armature in order to enable the flux of the coil to overcome the flux of the magnets and effect easy release of the brake and engagement of the clutch when the coil is energized.

5 Claims, 2 Drawing Sheets

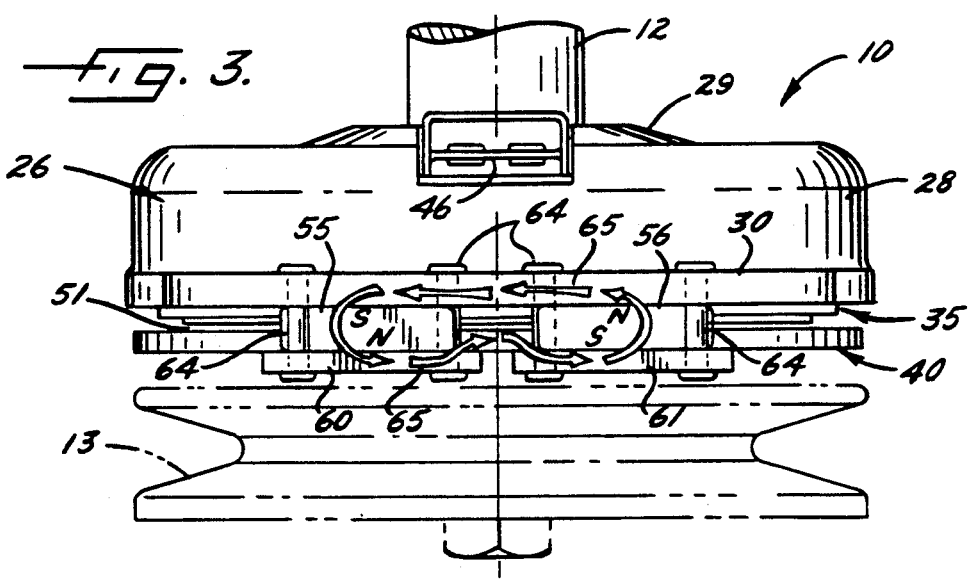
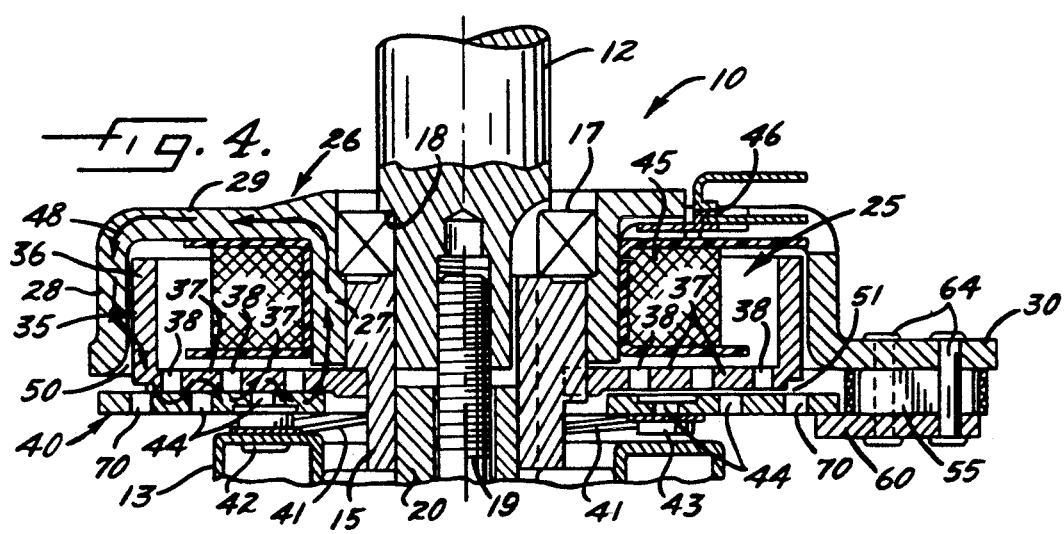
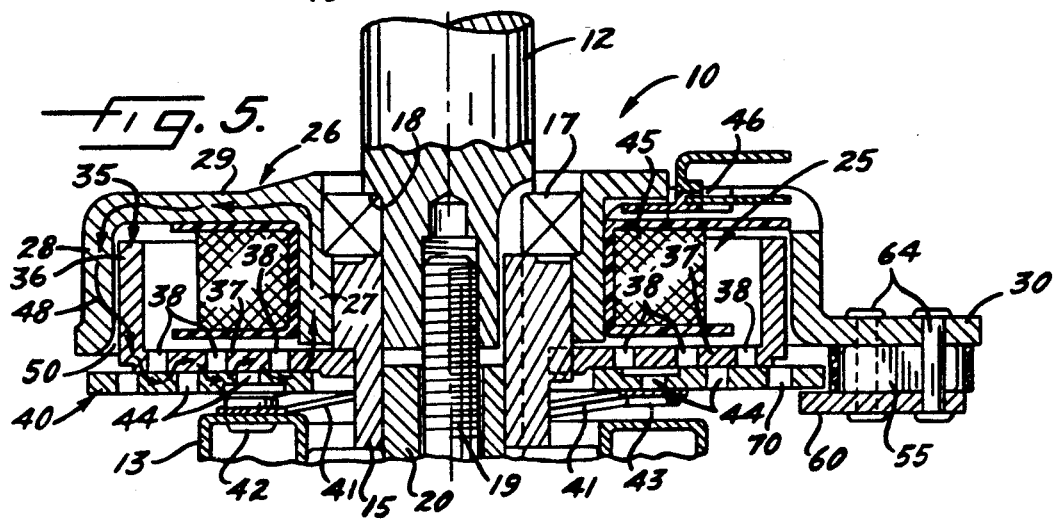

ELECTROMAGNETIC CLUTCH WITH PERMANENT MAGNET BRAKE

BACKGROUND OF THE INVENTION

This invention relates to a clutch/brake unit in which the clutch is electromagnetically actuated and, more particularly, to a clutch/brake unit which is especially adapted for use with a riding lawnmower, a garden tractor or similar vehicle having an electrical system with a battery and with an alternator for charging the battery. The purpose of the clutch/brake unit is to enable selective engagement and disengagement of an implement drive (e.g., a mower blade drive) and to apply a positive braking torque to the drive when the drive is disengaged.

One type of prior clutch/brake unit used for these purposes includes an electromagnetic clutch having a stationary field shell, an electrical coil disposed within the field shell, a rotor driven by an input member and rotatable relative to the field shell, and an armature connected to an output member and selectively rotatable relative to the rotor. When the coil is energized, magnetic flux threads through the field shell and the rotor and cuts axially across an air gap between the rotor and the armature to attract the armature into engagement with the rotor and thereby couple the output member for rotation in unison with the input member. Upon de-energization of the coil, springs pull the armature away from the rotor to disengage the clutch and allow the input member to rotate relative to the output member. At the same time, the springs pull the armature against a fixed braking member in order to bring the rotating output member to a relatively quick stop.

Because the braking force of such a clutch/brake unit is produced by the springs, the springs must be relatively strong in order to effectively brake the output member. As a result, high magnetic force must be created in order to overcome the springs and effect release of the brake and engagement of the clutch. As the armature moves nearer to engagement with the rotor, the springs become progressively more loaded and exert an even higher force resisting engagement of the armature with the rotor.

Since high magnetic force must be generated in order to overcome the relatively strong springs, the clutch/brake unit must employ a comparatively large electrical coil for creating such force. The use of a large coil requires that the vehicle be equipped with a rather high capacity electrical system for serving the coil as well as the other electrical accessories of the vehicle.

SUMMARY OF THE INVENTION

The general aim of the present invention is to provide a relatively low cost electromagnetically actuated clutch/brake unit which requires only a comparatively small electrical coil and yet is capable of producing relatively high braking torque.

Another object of the invention is to provide a clutch/brake unit which produces substantially constant braking torque over the life of the unit without requiring adjustment to compensate for wear.

A more detailed object is to achieve the foregoing by providing a clutch/brake unit in which the braking force is generated by uniquely arranged permanent magnets which eliminate the need of strong springs for applying the brake.

The invention also resides in the asymmetrical positioning of the permanent magnets relative to the clutch so as to facilitate quick release of the brake with relatively low force when the clutch coil is energized to engage the clutch.

The invention also is characterized by the provision of a unique magnetic circuit for isolating the flux of the permanent magnets from the flux of the coil.

These and other objects and advantages of the invention will become more apparent from the following detailed description when taken in conjunction with the accompanying drawings.

BRIEF DESCRIPTION OF THE DRAWINGS

FIG. 3 is a side elevational view as seen along the line 3—3 of FIG. 2.

FIG. 4 a fragmentary view similar to FIG. 1 but shows the unit just when the brake is starting to release and the is starting to engage.

FIG. 5 is another fragmentary view similar to FIG. 1 but shows the brake fully released and the clutch fully engaged.

DETAILED DESCRIPTION OF THE PREFERRED EMBODIMENT

Figure 1:
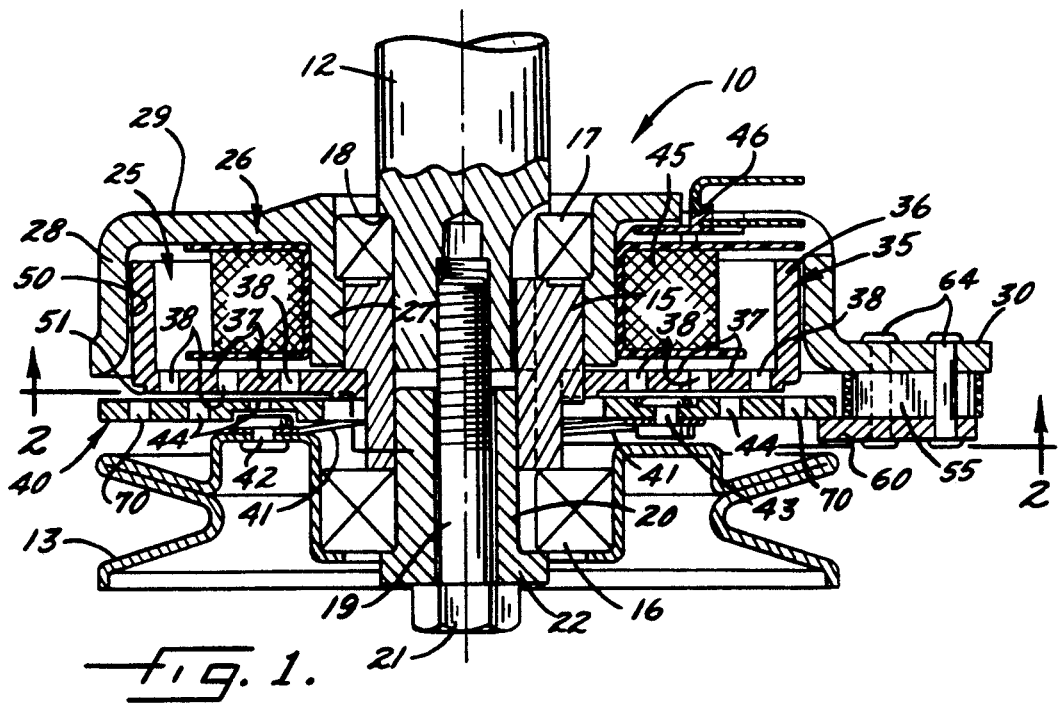
FIG. 1 is a view taken axially through a new and improved clutch/brake unit incorporating the unique features of the present invention and shows the clutch fully released and the brake fully engaged.

For purposes of illustration, the invention has been shown in the drawings as embodied in a clutch/brake unit 10. While the unit has many applications, it is especially adapted for use in conjunction with the engine of a riding lawn mower or garden tractor. The engine includes a downwardly projecting drive shaft 12. An output member in the form of a pulley 13 is adapted to be rotated by the shaft and is adapted to be connected by a belt to a mower blade or other driven device.

In general, the clutch/brake unit 10 includes an input member or hub 15 which is keyed to the drive shaft 12 of the engine. Located at the lower end of the hub is a bearing 16 which supports the pulley 13 to rotate relative to the hub. A second bearing 17 is located between the upper end of the hub and a shoulder 18 on the drive shaft. The various components are held in assembled relation by a screw 19 threaded into the lower end portion of the drive shaft and extending through a bushing 20, the latter extending through the bearing 16 and being keyed within the hub 15. The head 21 of the screw clamps a flange 22 on the bushing against the lower side of the bearing 16.

The clutch/brake unit 10 further includes an electromagnetic clutch 25 having a rotationally fixed field shell 26. The shell is of inverted U-shaped cross-section and includes inner and outer pole rings 27 and 28 connected by a top section 29. The bearing 17 supports the shell 26 while enabling the shaft 12 and the hub 15 to rotate within the inner pole ring 27 of the shell. Rotation of the field shell is prevented by an anti-rotation flange 30 formed integrally with and extending radially outwardly from one side of the lower end of the outer pole ring 28. Fasteners (not shown) extend through notches 31 (FIG. 2) in the end portions of the flange 30 and secure the field shell to the engine block or other fixed structure.

Secured to the input hub 15 is a rotor 35 having a pole ring 36 disposed with rotatable clearance within the field shell 26 adjacent the outer pole ring 28 thereof. The rotor includes a lower friction disc 37 formed integrally with the lower end of the pole ring 36 and connected to rotate with the input hub 15. Formed through the disc 37 is a plurality of radially spaced rows of angularly spaced slots 38. In this particular instance, there are three concentric rows of slots formed in the disc.

Coacting with the rotor 35 is an armature 40 which is connected to rotate with and move axially relative to the output pulley 13. For this purpose, three angularly spaced leaf springs 41 are located between the pulley and the armature, one end portion of each spring being secured to the pulley by a rivet 42 while the opposite end portion of each spring is connected to the armature by a rivet 43. The springs transmit torque from the armature to the pulley and allow the armature to shift axially relative to the pulley and toward and away from the disc 37 of the rotor 35.

Radially spaced rows of angularly spaced slots 44 also are formed through the armature 40. Herein, there are two rows of slots 44 with one row being located between the inner and center rows of slots 38 in the rotor disc 37 and with the other row being located between the center and outer rows of slots 38 in the rotor disc.

Completing the clutch 10 is a coil 45 formed by a multiple turn winding disposed within the field shell 26 between the inner and outer pole rings 27 and 28 thereof and connected electrically to a terminal block 46 which, in turn, is adapted to be connected to a voltage source such as the battery of the riding mower or tractor. When the coil is energized, magnetic flux is produced and threads a circuit designated as 48 in FIG. 4. Specifically, flux threads from the outer pole ring 28 of the field shell 26 and across a radial air gap 50 to the pole ring 36 of the rotor 35, cuts back and forth several times across an axial air gap 51 between the rotor friction disc 37 and the armature 40, and then threads from the friction disc to the inner pole ring 27 of the field shell. Such flux attracts the armature 40 into engagement with the rotor disc 37 as shown in FIG. 5 and causes the armature and the output pulley 13 to rotate in unison with the rotor 35 and the input hub 15. The springs 41 permit the armature to move axially into engagement with the rotor and act to transmit torque from the armature to the pulley. Upon de-energization of the coil 45, the springs apply a force tending to pull the armature out of engagement with the rotor disc. When the armature is in its clutch-disengaged position shown in FIG. 1, the input hub 15 and rotor 35 turn without driving the armature 40 and the pulley 13.

The three rows of slots 38 in the rotor disc 37 and the two rows of slots 44 in the armature 40 cause the flux in the path 48 to cross the axial air gap 51 a total of six times and thus the clutch 25 is a six-pole clutch capable of developing relatively high torque. By omitting any one of the rows of slots in either the rotor or the armature, the clutch may be made as a lower torque four-pole clutch capable of using a somewhat smaller coil. If the clutch is constructed as a four-pole clutch, it is preferable from a tooling standpoint to omit the center row of slots 38 in the rotor disc 37.

When the clutch 25 is disengaged, it is necessary to bring the output pulley 13 to a complete stop in a relatively short period of time (e.g., three seconds). In many prior clutch/brake units of the same general type as the present unit 10, the springs 41 are made sufficiently strong to hold the armature 40 tightly against a fixed braking member when the coil 45 is de-energized and thereby cause a braking torque to be applied to the armature and the pulley. The use of strong springs, however, requires that the magnetic force developed by the clutch be sufficiently great to overcome the force of the springs to pull the armature 40 into engagement with the rotor 35.

In accordance with the present invention, permanent magnets 55 and 56 are uniquely positioned relative to the armature 40 and coact therewith to bring the output pulley 13 to a quick stop when the clutch 25 is disengaged. As will become apparent subsequently, utilization of permanent magnets to create the braking force enables the use of much lighter springs 41 and this, in turn, reduces the power requirements of the clutch and enables the clutch/brake unit 10 to be used in conjunction with a vehicle having a relatively light duty electrical generating system.

More specifically, two permanent magnets 55 and 56 are used in the present instance although, under certain circumstances, more than two magnets could be employed. The magnets preferably are in the form of flat ceramic wafers which are magnetized such that each magnet has axially facing poles of opposite polarity. Simply for purposes of illustration, the magnets have been shown with the magnet 55 having an upwardly facing south pole and a downwardly facing north pole and with the magnet 56 having an upwardly facing north pole and a downwardly facing south pole. It should be understood, however, that the specific polarity of the magnets may vary as long as like poles of adjacent magnets face in axially opposite directions.

The magnets 55 and 56 are located in closely spaced end-to-end relation beneath and in engagement with the flange 30 of the field shell 26 and are located in overlying engagement with pole pieces 60 and 61, respectively, made of steel or other material having low magnetic reluctance. Each magnet is captivated between the flange 30 and the respective pole piece by a pair of rivets 64 which also serve to attach the pole piece securely to the flange. The pole pieces are located such that their inner edge portions underlie an outer peripheral portion of the armature 40.

Figure 2:
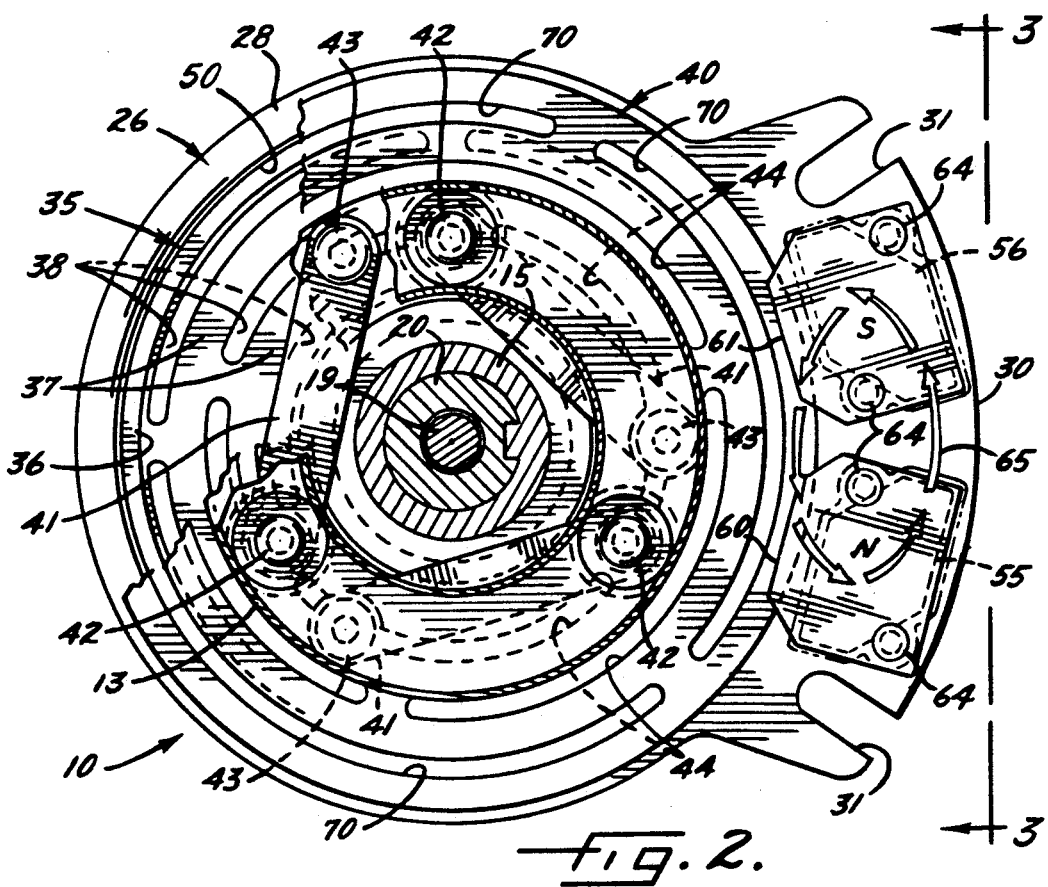
FIG. 2 is a cross-section taken substantially along the line 2—2 of FIG. 1.

When the coil 45 is de-energized and the clutch 25 is disengaged, flux of the permanent magnets 55 and 56 threads a circuit indicated by the reference numeral 65 (FIGS. 2 and 3). Specifically, flux threads from the north pole of the magnet 55 into the pole piece 60 and then into the armature 40. The flux then cuts to the pole piece 61 and from the south pole to the north pole of the magnet 56 to the flange 30 of the field shell 26 for return to the south pole of the magnet 55. Such flux creates a force attracting the armature 40 downwardly into engagement with the pole pieces 60 and 61 so that the fixed pole pieces apply braking torque to the armature.

Importantly, the magnets 55 and 56 are asymmetrical with respect to the circular field shell 26 and armature 40 and are sized and located such that the angular distance spanned by the magnets and the pole pieces 60 and 61 extends around substantially less than one-half the circumference of the field shell. In this particular instance, the angle between non-adjacent ends of the two magnets is only about 60 degrees and thus the magnets extend around only about 1/6 of the periphery of the field shell. By virtue of this arrangement, the permanent magnet flux threads through only a relatively short arc of the field shell and the armature to minimize bucking of the permanent magnet flux with the flux produced by the coil 45. When the coil 45 is energized, the side of the armature 40 opposite the magnets 55 and 56 quickly snaps into engagement with the rotor disc 37 as shown in FIG. 4 while the side of the armature adjacent the magnet just momentarily remains in engagement with the pole pieces 60 and 61 as shown in FIG. 4. Once the armature starts pulling in, a rush of flux lines jumps across the air gap 51 between the rotor and the armature and floods the clutch poles causing the armature/rotor attractive force to increase to several magnitudes higher than the armature/pole piece attractive force and thereby easily pull the armature away from the pole pieces and to its full clutch-engaged position shown in FIG. 5.

Advantageously, an additional set of angularly spaced slots 70 is formed through the armature 40 and is located radially outwardly of the outermost row of slots 38 in the rotor disc 37. The slots 70 tend to isolate the permanent magnet flux from the flux produced by the coil 45 and reduce the tendency of the magnets 55 and 56 to hold the armature 40 against the pole pieces 60 and 61 when the coil is energized to engage the clutch 25.

With the foregoing arrangement, energization of the coil 45 snaps the armature 40 away from the pole pieces 60 and 61 to engage the clutch 25 and negate the braking action of the pole pieces. When the coil is de-energized, the permanent magnet 55 and 56 pull the armature away from the rotor disc 37 and in engagement with the pole pieces so that braking torque may be applied to the output pulley 13 via the armature. Because the braking force is produced by the magnets rather than by the springs 41, the springs need only be sufficiently strong to transmit torque between the armature and the pulley and thus the springs provide little resistance to engagement of the clutch. Moreover, as the armature moves toward the rotor, the force exerted by the magnets on the armature decreases whereas the force exerted by springs in a spring-based braking system increases. Because less force is required to engage the clutch 25, the power requirements of the clutch are lower and thus the clutch imposes less drain on the battery of the vehicle's electrical system. Also, a lighter duty and less expensive clutch may be used.

Because the springs 41 need not be axially strong, the clutch 25 may operate at full torque even when a relatively large air gap 51 (e.g., an air gap as large as 0.080") exists between the rotor disc 37 and the armature 40. As a result, significant wear may occur and yet the clutch 25 is capable of developing full torque without adjustment. Moreover, more consistent braking torque is possible since the use of the permanent magnets 55 and 56 negates the effect of tolerance stack-ups in the clutch 25 on the brake torque.

It has been found that the use of two angularly spaced magnets 55 and 56 produces substantially greater braking torque than a single magnet having the same surface area as the two magnets. One of the magnets tends to draw flux from the other to increase the total number of lines of flux passing between the armature 40 and the pole pieces 60 and 61. Since the armature normally is in engagement with the magnets, the armature serves in the same fashion as a "keeper bar" to help prevent the magnets from de-magnetizing over a period of time.

In order for the clutch/brake unit 10 to function properly, it is imperative that the magnets 55 and 56 be installed with like poles facing in axially opposite directions. To guard against installation of the magnets with like poles facing axially in the same direction, each magnet is shaped with six parallel sides. The two magnets are identical in shape and each is magnetized in the same direction. The rivets 64 of the pole piece 60 and those of the pole piece 61 are located such that a magnet can be placed between the rivets of the pole piece 60 only when the magnet has a given orientation while a magnet can be placed between the rivets of the pole piece 61 only when that magnet is inverted 180 degrees about a horizontal axis with respect to the first magnet. Accordingly, inadvertent installation of the magnets with like poles facing in the same direction is precluded.

I claim:

1. A clutch/brake unit having an electromagnetic field shell fixed against rotation, an input member supported for rotation relative to said field shell, an output member supported for rotation relative to said input member, a rotor rotatable with said input member, an armature rotatable with said output member and normally spaced axially from said rotor in a clutch-released position, a selectively energizable coil for producing magnetic flux which threads through said field shell, said rotor and said armature to attract said armature axially into engagement with said rotor to a clutch-engaged position, said field shell being generally circular and having an outer periphery, a plurality of angularly spaced permanent magnets fixed to the outer periphery of said field shell and located closely adjacent one another, said magnets being sized and located such that the angular distance spanned by said magnets extends around less than one-half the circumference of the outer periphery of the field shell, said magnets having axially facing poles and being oriented with one pole of one magnet facing axially in one direction and with the corresponding pole of an adjacent magnet facing axially in the opposite direction, pole pieces fixed to said field shell and engaging said armature when the latter is in said clutch-released position, said permanent magnets being sandwiched between said pole pieces and said field shell, flux from said permanent magnets threading through said pole pieces, said armature and said field shell when said armature is in said clutch-released position and attracting said armature to said pole pieces so as to apply a braking force to said armature, the flux of said coil overcoming the flux of said permanent magnets when said coil is energized and forcing said armature away from said pole pieces to said clutch-engaged position.

2. A clutch/brake unit as defined in claim 1 in which said rotor and said armature are each formed with a plurality of radially spaced rows of angularly spaced slots delineating a coil flux circuit causing flux of said coil to thread back and forth between said rotor and said armature, and an additional set of angularly spaced slots formed in said armature and located radially outwardly of the outermost one of said rows of slots so as to isolate flux of said permanent magnets from said coil flux circuit.

3. A clutch/brake unit as defined in claim 2 in which said coil clutch circuit is delineated by three radially spaced rows of angularly spaced slots in one of said rotor and armature and by two radially spaced rows of angularly spaced slots in the other of said rotor and armature.

4. A clutch/brake unit as defined in claim 1 further including means on said field shell and preventing said magnets from being fixed to said field shell with one pole of one magnet facing axially in the same direction as the corresponding pole of an adjacent magnet.

5. A clutch/brake unit having an electromagnetic field shell fixed against rotation, an input member supported for rotation relative to said field shell, an output member supported for rotation relative to said input member, a rotor rotatable with said input member, a generally circular armature rotatable with said output member and normally spaced axially from said rotor in a clutch-released position, a selectively energizable coil for producing magnetic flux which threads through said field shell, said rotor and said armature to attract said armature axially into engagement with said rotor to a clutch-engaged position, first and second angularly spaced permanent magnets fixed to said field shell and located closely adjacent one another, said magnets having axially facing poles and being oriented With one pole of one magnet facing axially in one direction and with the corresponding pole of the other magnet facing axially in the opposite direction, first and second angularly spaced pole pieces fixed to said field shell, said first and second magnets being sandwiched between said field shell and said first and second pole pieces, respectively, said pole pieces engaging said armature when the latter is in said clutch-released position and being sized and located such that said armature is engaged only along two angularly spaced arcs located closely adjacent one another and together subtending substantially less than 180 degrees, flux from said permanent magnets threading through said first pole piece, said armature, said second pole piece and said field shell when said armature is in said clutch-released position and attracting said armature to said pole pieces so as to apply a braking force to said armature, the flux of said coil overcoming the flux of said permanent magnets when said coil is energized and forcing said armature away from said pole pieces to said clutch-engaged position.

* * * * *